United States Patent
Tsuruta et al.

(10) Patent No.: US 9,117,298 B2
(45) Date of Patent: Aug. 25, 2015

(54) IMAGE PROCESSING DEVICE, IMAGE PROCESSING SYSTEM AND BANK MANAGEMENT METHOD

(75) Inventors: Toru Tsuruta, Kawasaki (JP); Soutaro Kaneko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 592 days.

(21) Appl. No.: 13/409,696

(22) Filed: Mar. 1, 2012

(65) Prior Publication Data

US 2012/0249834 A1  Oct. 4, 2012

(30) Foreign Application Priority Data

Mar. 29, 2011  (JP) .................................. 2011-073674

(51) Int. Cl.
| | |
|---|---|
| *G06T 1/60* | (2006.01) |
| *G09G 5/12* | (2006.01) |
| *G09G 5/399* | (2006.01) |
| *G09G 5/00* | (2006.01) |

(52) U.S. Cl.
CPC .. *G06T 1/60* (2013.01); *G09G 5/12* (2013.01); *G09G 5/399* (2013.01); *G09G 5/005* (2013.01); *G09G 2340/0435* (2013.01)

(58) Field of Classification Search
CPC ...................................................... G06T 1/60
USPC .......................................................... 345/565
See application file for complete search history.

(56) References Cited

U.S. PATENT DOCUMENTS

| | | | | |
|---|---|---|---|---|
| 5,818,434 | A  * | 10/1998 | Yamamoto et al. | 345/565 |
| 5,914,728 | A  * | 6/1999 | Yamagishi et al. | 345/565 |
| 7,110,027 | B2 * | 9/2006 | Wyman | 348/231.9 |
| 2003/0110347 | A1* | 6/2003 | Henderson et al. | 711/104 |
| 2006/0001671 | A1* | 1/2006 | Kamijo et al. | 345/531 |
| 2006/0250356 | A1* | 11/2006 | Sawamura | 345/156 |
| 2011/0102617 | A1* | 5/2011 | Seri et al. | 348/222.1 |

FOREIGN PATENT DOCUMENTS

| | | |
|---|---|---|
| JP | 8-214131 | 8/1996 |
| JP | 10-322643 | 12/1998 |

* cited by examiner

*Primary Examiner* — Devona Faulk
*Assistant Examiner* — Hai Tao Sun
(74) *Attorney, Agent, or Firm* — Staas & Halsey LLP

(57) ABSTRACT

An image processing device includes: first to third address registers that store three addresses, respectively, the three addresses indicating three bank regions, respectively; an input image bank managing unit that, when the image processing device receives an image from an imaging device, switches, between the first address register and the second address register, and sets a flag and supplies the address stored in the first address register as an address for writing the received image; an imaging processing unit that performs image processing on the received image; and an image processing bank managing unit that, when the flag is in a set state and the processed image is switched to another image to be processed, switches, between the second address register and the third address register, resets the flag and supplies to the image processing unit the address stored in the third address register.

12 Claims, 11 Drawing Sheets

IMAGE PROCESSING DEVICE, IMAGE PROCESSING SYSTEM AND BANK MANAGEMENT METHOD

CROSS-REFERENCE TO RELATED APPLICATION(S)

This application is based upon and claims the benefit of priority of the prior Japanese Patent Application No. 2011-73674, filed on Mar. 29, 2011, the entire contents of which are incorporated herein by reference.

FIELD

The embodiments discussed herein are related to image processing using banks and a bank memory management method.

BACKGROUND

In a camera system, data of a series of images acquired by an imaging device is processed by an image processing device, and the series of processed images are sequentially displayed by a display device. In order to process the images on the basis of the operation timing of the image processing device, input image data for one frame is completely stored in a memory of the image processing device, and then the image processing device performs image processing on the stored image data, and holds the stored data in the memory until the image processing device completes the image processing on the stored image data.

During the image processing, the next image data is input to the image processing device from the imaging device. In order to inhibit image data that is currently processed from being broken, a plurality of memory spaces (hereinafter referred to as banks) that are configured to store images are prepared. When the image processing device completely stores input image data for one frame in a single bank, the image processing device stores image data for the next frame in another bank. In this case, the bank is switched to the other bank in order to store the image data by switching management addresses (that are each a starting address of a memory space for one frame, for example) of the banks configured to store image data.

In each of many camera systems, the timing of starting an operation of an imaging device is not synchronous with the timing of starting an operation of an image processing device. In addition, in each of the camera systems, time intervals between times when the imaging device performs a process are different from time intervals between times when the image processing device performs image processing in many cases. In general, in each of the camera systems, an oscillator for the imaging device is different from and independent of an oscillator for the image processing device. In each of the camera systems, even when oscillation frequencies of both oscillators are equal to each other according to design specifications of the oscillators, the actual operation timing of the imaging device does not completely match the actual operation timing of the image processing device owing to an error. In order to synchronize the imaging device with the image processing device, a mechanism for performing communication control, a phase-locked loop, or the like is provided. In this case, however, there is a problem with the cost. Thus, there is a demand for a system to be designed so that there is no practical problem even when an imaging device and an image processing device are not synchronized with each other.

For example, Japanese Laid-open Patent Publication No. 08-214131 discloses a method in which two buffer memories are alternately switched and data is read and transferred simultaneously. In addition, for example, Japanese Laid-open Patent Publication No. 10-322643 discloses that two or more physical banks are ensured in a frame memory and image data is written in the physical banks and read from the physical banks in order to display the image data.

SUMMARY

According to an aspect of the invention, an image processing device includes: first to third address registers that store three addresses, respectively, the three addresses indicating three bank regions, respectively; an input image bank managing unit that, when the image processing device receives an image from an imaging device, switches, between the first address register and the second address register, correspondence relationships between the first and second address registers and the addresses stored in the first and second address registers, sets a flag and supplies the address stored in the first address register as an address for writing the received image; an imaging processing unit that performs image processing on the received image; and an image processing bank managing unit that, when the flag is in a set state and the processed image is switched to another image to be processed, switches, between the second address register and the third address register, correspondence relationships between the second and third address registers and the addresses stored in the second and third address registers, resets the flag and supplies, to the image processing unit, the address stored in the third address register as an address for reading the processed image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
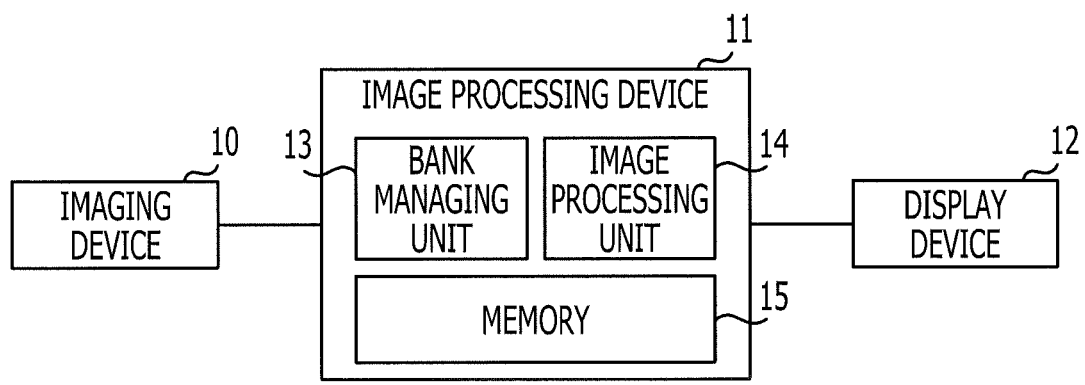
FIG. 1 is a diagram illustrating an example of the configuration of an image processing system.

As described above, there is a very low possibility that the timing of starting an operation of an imaging device is synchronous with the timing of starting an operation of an image processing device. Thus, in the following description, it is assumed that the timing of starting the operation of the imaging device and the timing of starting the operation of the image processing device are shifted from each other.

When a cycle of the operation of the imaging device and a cycle of the operation of the image processing device are equal to each other, three banks are used in the minimum configuration of the image processing device. One of the three banks is configured to store an input image, while the other two banks are configured to store images to be processed. The bank that is configured to store an input image, and a bank that is among the two banks configured to store images to be processed and stores an image that is chronologically older than an image stored in the other bank among the two banks configured to store images to be processed, are switched when the imaging device starts operating. When it is time to start to perform image processing, the image processing starts to be performed on the image that is stored in the bank configured to store an image to be processed and is chronologically newer than the image stored in the other bank configured to store an image to be processed. The banks that are configured to store images to be processed hold the same data for a time period corresponding to two frames. When the image processing is to be completed for a time period corresponding to one frame, and there is a certain difference between the time when the imaging device starts operating and the time when the image processing device starts operating, the image processing can be completed without breaking a series of acquired image data.

When the cycle of the operation of the imaging device and the cycle of the operation of the image processing device are not equal to each other, for example, when the cycle of the operation of image processing device is equal to a half of the cycle of the operation of the imaging device, four banks are used in the minimum configuration of the image processing device. One of the four banks is configured to store an input image, while the other three banks are configured to store images to be processed. The bank that is configured to store an input image, and a bank that is among the three banks configured to store images to be processed and stores an image that is chronologically oldest among images stored in the three banks configured to store images to be processed, are switched when the imaging device starts operating. When it is time to start to perform the image processing, the image processing starts to be performed on an image that is stored in a bank among the three banks configured to store images to be processed and is chronologically newest among the images stored in the three banks configured to store images to be processed. The image processing starts to be performed on the images stored in the three banks (configured to store images to be processed) at different times so that the image processing is performed on two of the images in parallel. The three banks that are configured to store images to be processed hold the same data for a time period corresponding to three frames. When the image processing is to be completed for a time period corresponding to two frames, and there is a certain difference between the time when the imaging device starts operating and the time when the image processing device starts operating, the image processing can be completed without breaking a series of acquired image data.

The optimal number of banks that are included in the image processing device is determined depending on the relationship between the cycle of the operation of the imaging device and the cycle of the operation of the image processing device and the relationship between the timing of starting the operation of the imaging device and the timing of starting the operation of the image processing device so that images of continuous frames can be input and processed while image data to be processed is not broken. However, a managing unit that is configured to manage switching of the banks of the image processing device switches the banks when the imaging device starts operating. Thus, normally, the managing unit is achieved by hardware. Since the managing unit is achieved by the hardware, it is difficult to design and achieve a system that manages banks so that the number of banks is variable. In addition, it is difficult to support various cycles of the operations and various timing of starting the operations. Even when the system is designed to manage a fixed number of banks, it is difficult for the system to appropriately support various cycles of the operations and various timing of starting the operations.

In light of the above description, a technique for appropriately supporting various cycles of the operations and various timing of starting the operations is desired.

Embodiments of the disclosure are described in detail below with reference to the accompanying drawings.

FIG. 1 is a diagram illustrating an example of the configuration of an image processing system. An image processing system illustrated in FIG. 1 includes an imaging device 10, an image processing device 11 and a display device 12. The imaging device 10 is a video camera or the like. The imaging device 10 acquires a series of images (to be acquired) and supplies data of the series of images to the image processing device 11. The image processing device 11 receives, as input images, the data of the series of images from the imaging device 10 and performs predetermined image processing so as to process the images (frames). The display device 12 is a liquid crystal display panel or the like and displays the images processed by the image processing device 11.

The image processing device 11 includes a bank managing unit 13, an image processing unit 14 and a memory 15. The memory 15 has at least three bank regions. One of the three bank regions is used as a bank region configured to store an input image. Another one of the three bank regions is used as a bank region configured to store an image to be next processed. The other of the three bank regions is used as a bank region configured to store an image to be currently processed. The bank managing unit 13 manages three addresses that indicate the three bank regions, respectively, so that an input image that is received by the image processing device 11 from the imaging device 10 is written in an appropriate bank region among the bank regions and the image processing unit 14 reads an image to be processed from an appropriate bank region among the bank regions. The image processing unit 14 performs the predetermined image processing.

In FIG. 1 and later, boundaries between each of functional blocks indicated by boxes and the other functional blocks indicate basically functional boundaries and do not necessarily indicate separations of physical positions, separations of electrical signals, logical separations of control, and the like. When the functional blocks are hardware, each of the functional blocks may be a single hardware module that is physically separated by a certain distance from the other functional blocks or may be a single function included in a hardware module that is physically integrated with at least one of the other functional blocks. When the functional blocks are software, each of the functional blocks may be a single software module that is logically separated to some extent from the other functional blocks or may be a single function included in a software module that is logically integrated with at least one of the other functional blocks.

Figure 2:
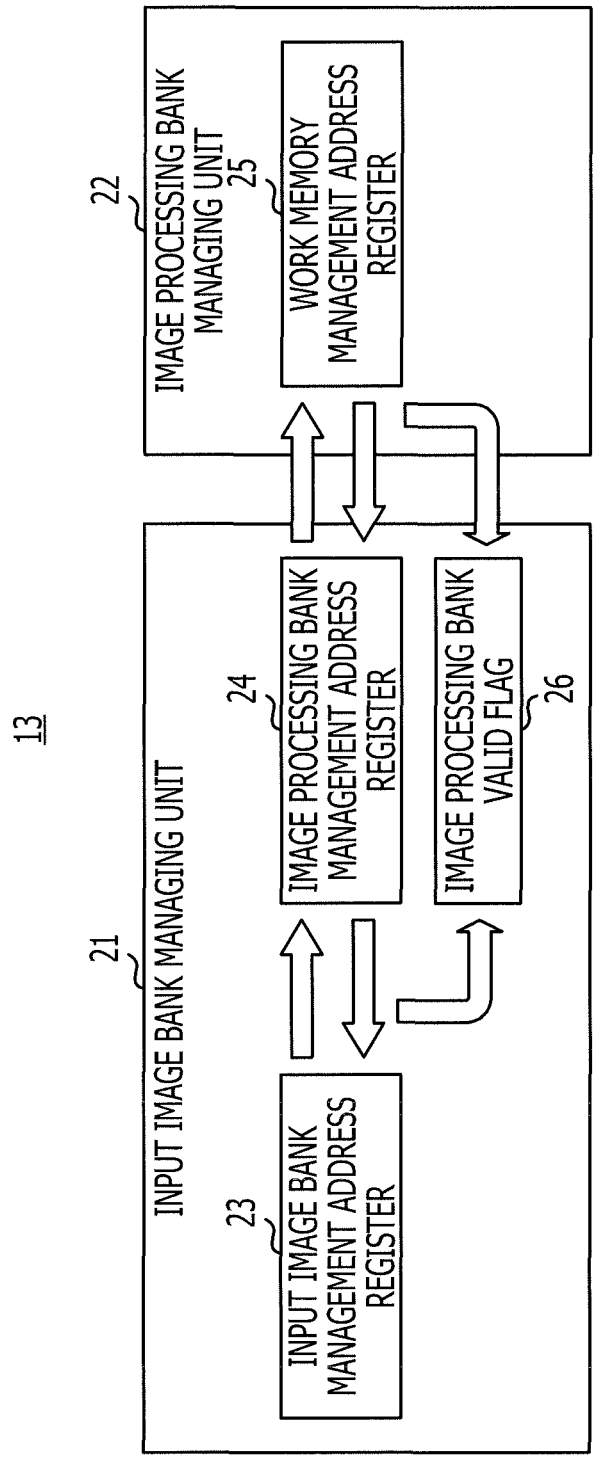
FIG. 2 is a diagram illustrating a functional configuration and operations of a bank managing unit.

FIG. 2 is a diagram illustrating a functional configuration and operations of the bank managing unit 13. The bank managing unit 13 includes an input image bank managing unit 21 and an image processing bank managing unit 22. The bank managing unit 13 includes an input image bank management address register 23 for an input image, an image processing bank management address register 24 for an image to be processed, a work memory management address register 25 and an image processing bank valid flag 26 for the image to be processed. As illustrated in FIG. 2, the input image bank managing unit 21 may include the input image bank management address register 23, the image processing bank management address register 24, and the image processing bank valid flag 26. The image processing bank managing unit 22 may include the work memory management address register 25. The input image bank management address register 23, the image processing bank management address register 24, the work memory management address register 25 and the image processing bank valid flag 26 may be separated from the input image bank managing unit 21 and the image processing bank managing unit 22. In this case, the input image bank managing unit 21 and the image processing bank managing unit 22 correspond to a control function that controls the input image bank management address register 23, the image processing bank management address register 24, the work memory management address register 25 and the image processing bank valid flag 26.

The input image bank management address register 23, the image processing bank management address register 24 and the work memory management address register 25 store the three addresses, respectively, while the three addresses indicate the three bank regions (included in the memory 15 illustrated in FIG. 1), respectively. The address that is stored in the bank management address register 23 is the address that indicates the bank region configured to store an input image. The address that is stored in the bank management address register 24 is the address that indicates the bank region configured to store an image to be next processed. The address that is stored in the work memory management address register 25 is the address that indicates the bank region configured to store an image to be currently processed.

For example, the input image bank management address register 23 may be a single physical register or memory region, but is not limited to the same register or the same memory region. The same applies to the bank management address register 24 and the work memory management address register 25. As described later, a process of switching, between the input image bank management address register 23 and the image processing bank management address register 24, correspondence relationships between the address registers and the addresses to be stored is performed. In this case, the address that is stored in the input image bank management address register 23, and the address that is stored in the image processing bank management address register 24, may be switched between the input image bank management address register 23 and the image processing bank management address register 24. Alternatively, a function of the input image bank management address register 23 and a function of the image processing bank management address register 24 may be switched between the input image bank management address register 23 and the image processing bank management address register 24, while the addresses that are stored in the input image bank management address register 23 and the image processing bank management address register 24 are not switched between the input image bank management address register 23 and the image processing bank management address register 24. For example, it is assumed that an address 0x100 is stored in a first register that is the input image bank management address register 23 and an address 0x200 is stored in a second register that is the image processing bank management address register 24. In this case, in order to switch correspondence relationships between the stored addresses 0x100 and 0x200 and the first and second registers, the stored addresses 0x100 and 0x200 may be switched between the first and second registers so that the address 0x100 is stored in the second register and the address 0x200 is stored in the first register. Alternatively, a function of the first register and a function of the second register may be switched between the first register and the second register so that the first register that has the address 0x100 stored therein is used as the image processing bank management address register 24 and the second register that has the address 0x200 stored therein is used as the input image bank management address register 23.

The input image bank managing unit 21 switches, between the input image bank management address register 23 and the image processing bank management address register 24, the correspondence relationships between the address registers 23 and 24 and the addresses stored in the address registers 23 and 24 when an input image is switched to another input image. In addition, the input image bank managing unit 21 sets the image processing bank valid flag 26 when the input image is switched to the other input image. The time when the input image is switched to the other input image is the time when an image of a single frame included in a series of input images is switched to an image of the next frame included in the series of input images. For example, the bank managing unit 13 detects, on the basis of a vertical synchronizing signal Vsync supplied from the imaging device 10, the time when the input image is switched to the other input image. In addition, the input image bank managing unit 21 supplies, as an address for writing an input image, the address stored in the input image bank management address register 23 to the memory 15 (refer to FIG. 1). Thus, the input image (for the single frame) that is supplied from the imaging device 10 is written in the bank region that is indicated by the address for writing the input image and is included in the memory 15.

When the image processing bank valid flag 26 is in a set state, and a processed image is switched to another image to be processed, the image processing bank managing unit 22 switches, between the image processing bank management address register 24 and the work memory management address register 25, correspondence relationships between the address registers 24 and 25 and the addresses stored in the address registers 24 and 25. In addition, the image processing bank managing unit 22 resets the image processing bank valid flag 26 when the processed image is switched to the other image to be processed. The time when the processed image is switched to the other image to be processed is the time when a frame that is processed by the image processing unit 14 (refer to FIG. 1) and among frames included in the series of input images is switched to the next frame included in the series of input images. For example, when the image processing unit 14 outputs a switching signal every time the image processing unit 14 completely processes a single image, the bank managing unit 13 detects, on the basis of the switching signal, the time when the processed image is switched to the other image to be processed. The image processing bank managing unit 22 supplies, as an address for reading an image to be processed, the address stored in the work memory management address register 25 to the image processing unit 14. Thus, the image processing unit 14 reads data of an image for one frame from the bank region that is indicated by the address for reading the image to be processed and is included in the memory 15. Then, the image processing unit 14 performs predetermined image processing on the read image.

When the image processing bank valid flag 26 is in the set state, and the processed image is switched to the other image to be processed, the image processing bank managing unit 22 does not switch, between the image processing bank management address register 24 and the work memory management address register 25, the correspondence relationships between the address registers 24 and 25 and the addresses stored in the address registers 24 and 25. In this case, the work memory management address register 25 has stored therein the same address before and after the processed image is switched to the other image to be processed. Whether or not the image processing unit 14 repeatedly perform image processing on image data stored in the same bank region indicated by the same address depends on a design item. The image processing unit 14 may repeatedly perform the image processing on the image data stored in the same bank region indicated by the same address. In addition, the image processing unit 14 may not perform the image processing on the image data stored in the same bank region indicated by the same address twice.

The image processing bank valid flag 26 is a flag that indicates whether or not the image processing unit 14 has already read image data stored in the bank region indicated by the address stored in the image processing bank management address register 24. When the image processing bank valid flag 26 is in the set state (ON state), the image processing bank valid flag 26 indicates that the image data that is stored in the bank region indicated by the address stored in the image processing bank management address register 24 is yet to be processed (or yet to be read) by the image processing unit 14. When the image processing bank valid flag 26 is in a reset state (OFF state), the image processing bank valid flag 26 indicates that the image data that is stored in the bank region indicated by the address stored in the image processing bank management address register 24 has been already processed (or already read) by the image processing unit 14. As described above, the input image bank managing unit 21 sets the image processing bank valid flag 26 when the input image is switched to the other input image. As described above, the image processing bank managing unit 22 resets the image processing bank valid flag 26 when the processed image is switched to the other image to be processed.

Figure 3:
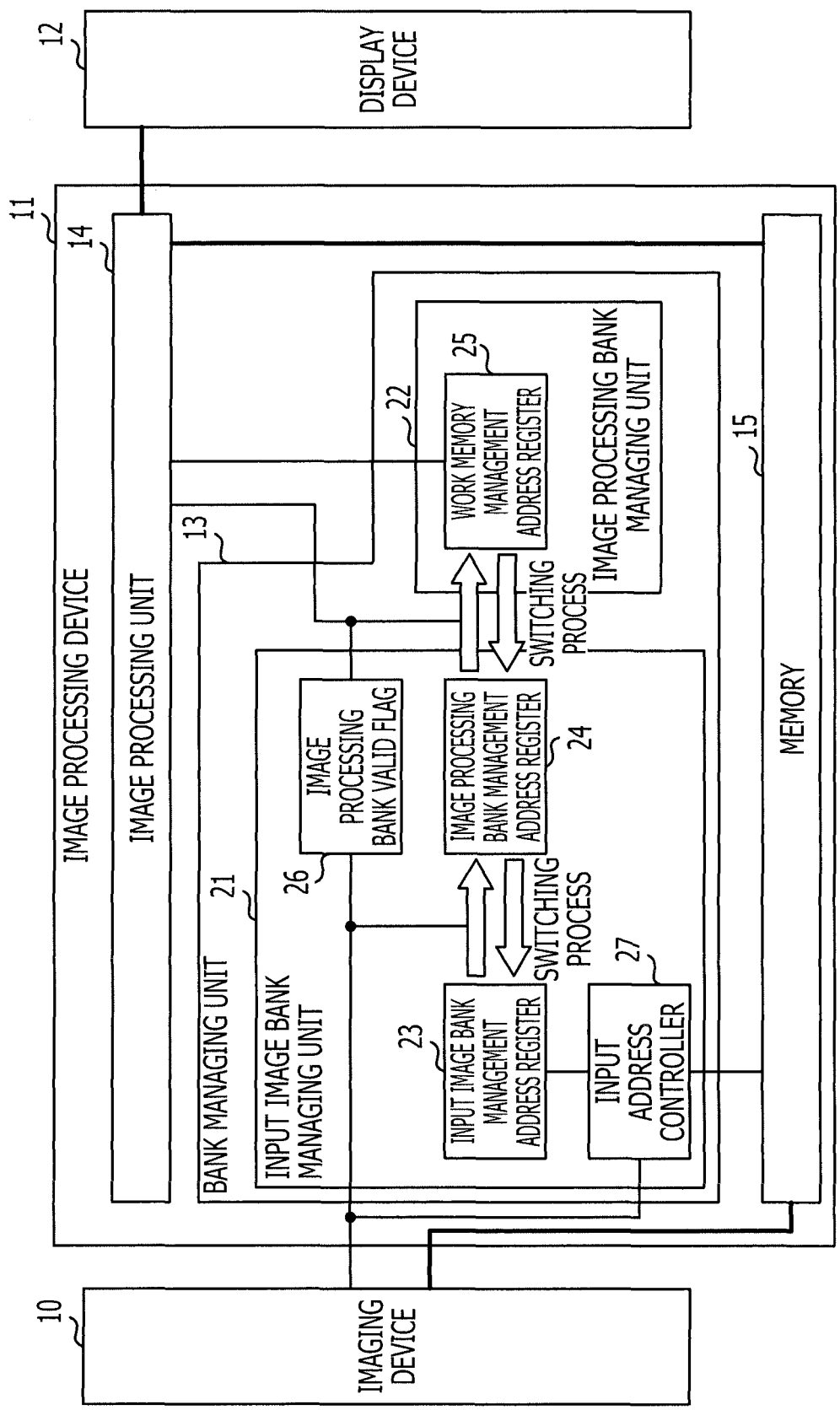
FIG. 3 is a diagram illustrating a detailed configuration of an image processing device.

FIG. 3 is a diagram illustrating a detailed configuration of the image processing device 11. In FIG. 3, constituent elements that are the same as illustrated in FIGS. 1 and 2 are indicated by the same reference numerals as illustrated in FIGS. 1 and 2, and a description thereof is omitted. The imaging device 10 supplies the vertical synchronizing signal Vsync to the input image bank managing unit 21 of the image processing device 11 illustrated in FIG. 3. In addition, the imaging device 10 supplies the vertical synchronizing signal Vsync to the image processing bank valid flag 26. The image processing bank valid flag 26 is set (or turned on) when the vertical synchronizing signal Vsync is asserted. The image processing unit 14 supplies a switching signal Image_pulse to the input image bank managing unit 21. In addition, the mage processing unit 14 supplies the switching signal Image_pulse to the image processing bank valid flag 26. The image processing bank valid flag 26 is reset (or turned off) when the switching signal Image_pulse is asserted.

The input image bank managing unit 21 switches, between the input image bank management address register 23 and the image processing bank management address register 24, the correspondence relationships between the address registers 23 and 24 and the addresses stored in the address registers 23 and 24 when the vertical synchronizing signal Vsync is asserted. In addition, the image processing bank managing unit 22 switches, between the image processing bank management address register 24 and the work memory management address register 25, the correspondence relationships between the address registers 24 and 25 and the addresses stored in the address registers 24 and 25 when the switching signal Image_pulse is asserted. However, the image processing bank managing unit 22 may switch, between the image processing bank management address register 24 and the work memory management address register 25, the correspondence relationships between the address registers 24 and 25 and the addresses stored in the address registers 24 and 25 only when the image processing bank valid flag 26 is in the set state.

The input image bank management address register 23 supplies the address stored in the input image bank management address register 23 to an input address controller 27 that is included in the input image bank managing unit 21. The input address controller 27 supplies, as the address for writing the input image, the address supplied from the input image bank management address register 23 to the memory 15, and supplies a write command to the memory 15. The input image that is supplied from the imaging device 10 is written, in accordance with the write command, in the bank region that is included in the memory 15 and indicated by the address for writing the input image.

The work memory management address register 25 supplies, as the address for reading the image to be processed, the address stored in the work memory management address register 25 to the image processing unit 14. The image processing unit 14 supplies, to the memory 15, a read command and the supplied address for reading the image to be processed. In accordance with the read command, data of the image is read into the image processing unit 14 from the bank region that is included in the memory 15 and indicated by the address for reading the image to be processed. The image processing unit 14 performs predetermined image processing on the read image and supplies the processed image to the display device 12. In this case, the image processing unit 14 may supply the processed image to the display device 12 in synchronization with a vertical synchronizing signal Vsync supplied from the display device 12.

Figure 4:
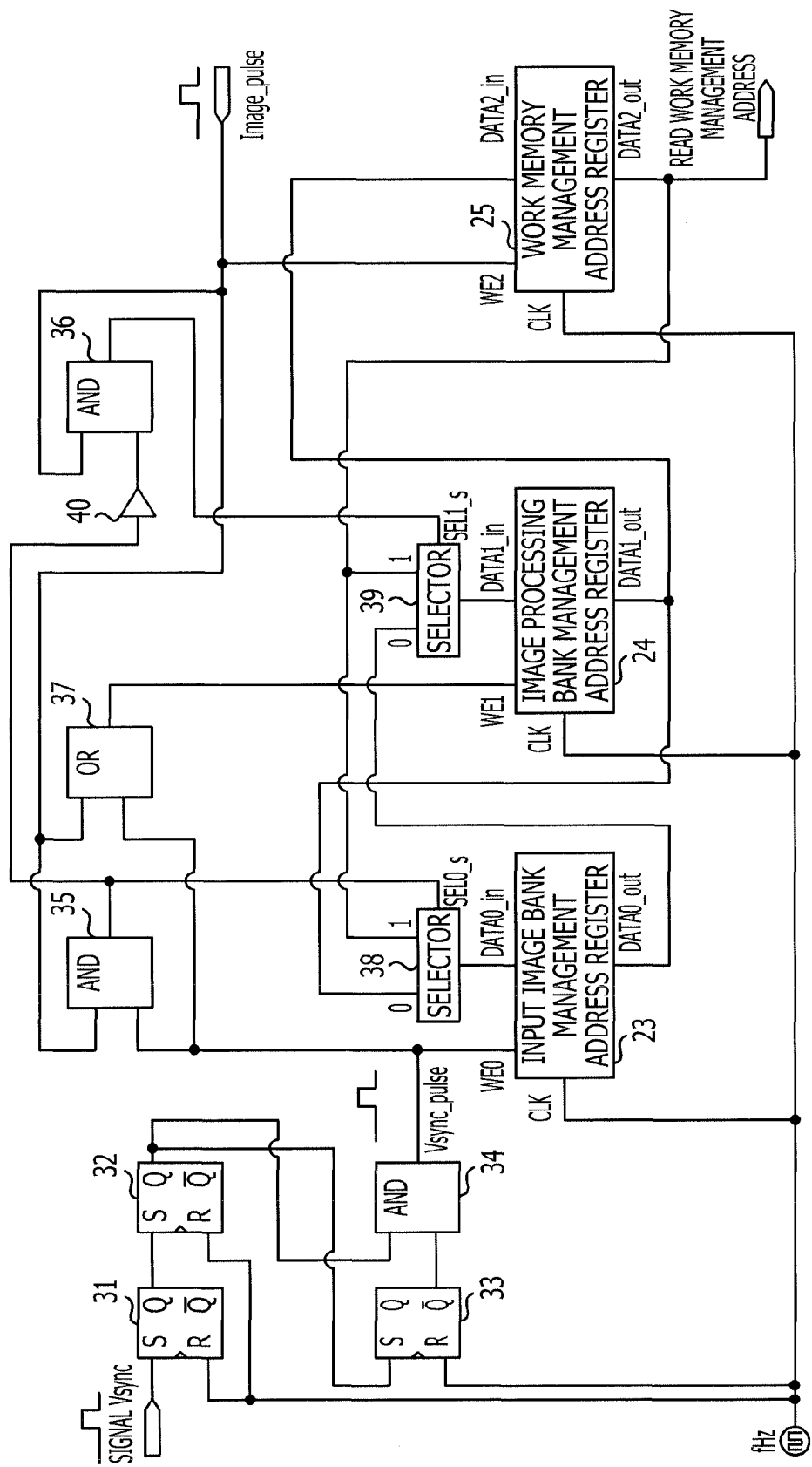
FIG. 4 is a diagram illustrating an example of the configuration of a circuit in which addresses that are stored in address registers are switched among the address registers.

FIG. 4 is a diagram illustrating an example of a circuit in which addresses stored in the management address registers are switched among them. Specifically, FIG. 4 illustrates the configuration of a circuit part in the bank managing unit 13, which is illustrated in FIG. 3, located near the input image bank management address register 23, the image processing bank management address register 24 and the work memory management address register 25. The circuit includes flip-flops 31 to 33, AND circuits 34 to 36, an OR circuit 37, selectors 38 and 39, and an inverter 40. The vertical synchronizing signal Vsync is supplied from the imaging device 10 to one of inputs of the AND circuit 34 through the flip-flops 31 and 32 that each operate in synchronization with a clock signal fHz. In addition, the vertical synchronizing signal Vsync is reversed by the flip-flops 31 to 33 (each operating in synchronization with the clock signal fHz) and then supplied to the other input of the AND circuit 34. Thus, the AND circuit 34 converts the vertical synchronizing signals Vsync into a one-pulse signal synchronizing with the clock signal fHz, and outputs the converted signal as a signal Vsync_pulse. The signal Vsync_pulse is supplied to the input image bank management address register 23 as a write enable signal WED and to the image processing bank management address register 24 through the OR circuit 37, as a write enable signal WE1.

The switching signal Image_pulse that is supplied from the image processing unit 14 (refer to FIG. 3) is a signal for one pulse width and synchronized with the clock signal fHz from the beginning of the switching signal Image_pulse. The image processing unit 14 supplies, as a write enable signal WE2, the switching signal Image_pulse to the work memory management address register 25. In addition, the image processing unit 14 supplies, as the write enable signal WE1, the switching signal Image_pulse to the image processing bank management address register 24.

Data DATA0_out that is output from the input image bank management address register 23 is supplied as input data DATA1_in through the selector 39 to the image processing bank management address register 24. Data DATA1_out that is output from the image processing bank management address register 24 is supplied as input data DATA0_in through the selector 38 to the input image bank management address register 23. In addition, the data DATA1_out that is output from the image processing bank management address register 24 is supplied as input data DATA2_in to the work memory management address register 25. Data DATA2_out that is output from the work memory management address register 25 is supplied as the input data DATA0_in through the selector 38 to the input image bank management address register 23. In addition, the data DATA2_out that is output from the work memory management address register 25 is supplied as the input data DATA1_in through the selector 39 to the image processing bank management address register 24.

Figure 5:
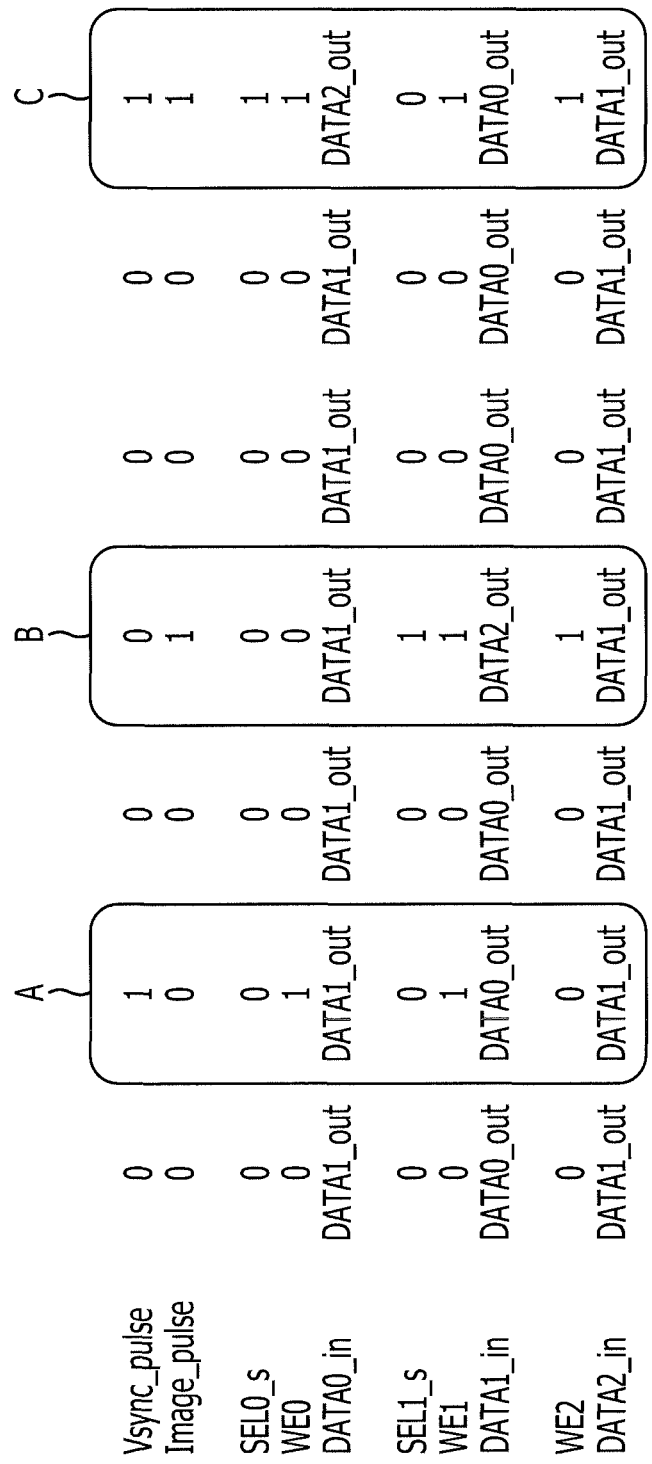
FIG. 5 is a diagram illustrating operations of the circuit illustrated in FIG. 4.

FIG. 5 is a diagram illustrating operations of the circuit illustrated in FIG. 4. A symbol "A" that is illustrated in FIG. 5 indicates the state in which the signal Vsync_pulse is in an asserted state and has a value of 1 and the switching signal Image_pulse is a negated state and has a value of 0. In this state, a selection signal SEL0_s that is output from the AND circuit 35 (refer to FIG. 4) to the selector 38 has a value of 0, and the selector 38 selects the data DATA1_out output from the image processing bank management address register 24 so that the data DATA1_out that is output from the image processing bank management address register 24 is supplied to the input image bank management address register 23 as the input data DATA0_in. In this case, the write enable signal WE0 is in an asserted state and has a value of 1, the address that is stored in the image processing bank management address register 24 is written in the input image bank management address register 23. In this case, a selection signal SEL1_s that is output from the AND circuit 36 (refer to FIG. 4) to the selector 39 has a value of 0, and the selector 39 selects the data DATA0_out output from the input image bank management address register 23 so that the data DATA0_out that is output from the input image bank management address register 23 is supplied to the image processing bank management address register 24 as the input data DATA1_in. In this case, the write enable signal WE1 is in an asserted state and has a value of 1, and the address that is stored in the input image bank management address register 23 is written in the image processing bank management address register 24.

A symbol "B" that is illustrated in FIG. 5 indicates the state in which the signal Vsync_pulse is in a negated state and has a value of 0 and the switching signal Image_pulse is in an asserted state and has a value of 1. In this state, a signal that is output from the AND circuit 35 (refer to FIG. 4) has a value of 0, the inverter 40 inverts the signal output from the AND circuit 35 and outputs the signal having a value of 1, and the AND circuit 36 (refer to FIG. 4) outputs, to the selector 39, the selection signal SEL1_s that has a value of 1. Thus, the selector 39 selects the DATA2_out output from the work memory management address register 25 so that the DATA2_out that is output from the work memory management address register 25 is supplied to the image processing bank management address register 24 as the input data DATA1_in. In this case, the write enable signal WE1 is in the asserted state and has the value of 1, and the address that is stored in the work memory management address register 25 is written in the image processing management address register 24. In addition, the data DATA1_out that is output from the image processing bank management address register 24 is supplied to the work memory management address register 25 as the input data DATA2_in. In this case, the write enable signal WE2 is in an asserted state and has a value of 1, and the address that is stored in the image processing bank management address register 24 is written in the work memory management address register 25.

A symbol "C" that is illustrated in FIG. 5 indicates the state in which the signal Vsync_pulse and the switching signal Image_pulse are simultaneously in the asserted state and each have the value of 1. In this state, the selection signal SEL0_s that is output from the AND circuit 35 (refer to FIG. 4) to the selector 38 has a value of 1, and the selector 38 selects the DATA2_out output from the work memory management address register 25 so that the DATA2_out that is output from the work memory management address register 25 is supplied to the input image bank management address register 23 as the input data DATA0_in. In this case, the write enable signal WE0 is in the asserted state and has the value of 1, and the address that is stored in the work memory management address register 25 is written in the input image bank management address register 23. In this case, the selection signal SEL1_s that is output from the AND circuit 36 (refer to FIG. 4) to the selector 39 has the value of 0, and the selector 39 selects the data DATA0_out output from the input image bank management address register 23 so that the data DATA0_out that is output from the input image bank management address register 23 is supplied to the image processing bank management address register 24 as the input data DATA1_in. In this case, the write enable signal WE1 is in the asserted state and has the value of 1, and the address that is stored in the input image bank management address register 23 is written in the image processing bank management address register 24. In addition, the data DATA1_out that is output from the image processing bank management address register 24 is supplied to the work memory management address register 25 as the input data DATA2_in. In this case, the write enable signal WE2 is in the asserted state and has the value of 1, and the address that is stored in the image processing bank management address register 24 is written in the work memory management address register 25.

Thus, even when the signal Vsync_pulse and the switching signal Image_pulse are simultaneously in the asserted state and each have the value of 1, the addresses that are stored in the management address registers can be appropriately switched among them. Thus, the address that is stored in the image processing bank management address register 24 can be written in the work memory management address register 25, and image data that is to be next processed can be subjected to image processing. In addition, the address that is stored in the input image bank management address register 23 can be written in the image processing bank management address register 24, and an input image can be held as an image to be next processed. In addition, the address that is stored in the work memory management address register 25 can be written in the input image bank management address register 23, and new image data can be written in the bank region that had stored processed image data.

Figure 6:
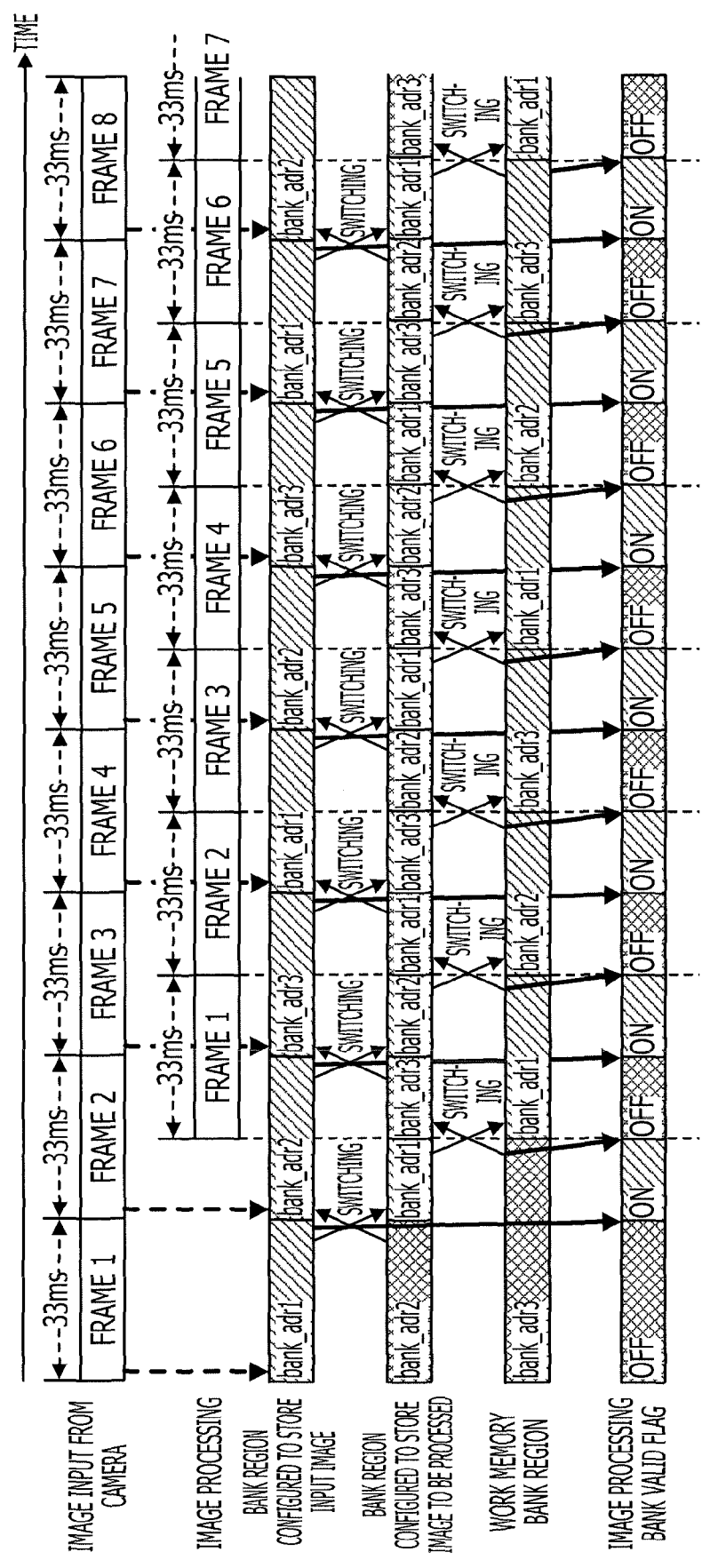
FIG. 6 is a diagram illustrating a first embodiment of operations of the image processing device.

FIG. 6 is a diagram illustrating a first embodiment of operations of the image processing device 11. The first embodiment describes the case in which a cycle of an input operation (camera input operation) that is performed by the imaging device 10 to input an image to the image processing device 11 is equal to a cycle of the image processing that is performed by the image processing device 11.

Operations of the input image bank managing unit 21 are described below. First, a frame 1 of an image is stored in the bank region, an address bank_adr1, assigned thereto. When the frame 1 is completely stored and switched to a frame 2, the addresses stored in the input image bank management address register and the image processing bank management address register are switched using the vertical synchronizing signal Vsync as a trigger. As a result, the address bank_adr2 becomes the address of the bank region for input images, and the bank_adr1 becomes the bank region for the images to be processed. In addition, the image processing bank valid flag 26 becomes a valid state (ON state). Operations that are repeatedly performed after the frame 1 are the same as the aforementioned operation except the bank address.

Next, operations of the image processing bank managing unit 22 are described. The image processing starts to be performed during the storage of the frame 2 in the bank region indicated by the address bank_adr2. Then, the image processing bank managing unit 22 switches the address stored in the image processing bank management address register 24 and the address stored in the work memory management address register 25. In addition, the image processing bank managing unit 22 turns the image processing bank valid flag 26 to the OFF state. Thus, the address bank_adr1 becomes the address of the bank region (work memory bank region) configured to store an image to be currently processed, and the frame 1 becomes a frame to be subjected to image processing. Operations that are performed for the frame 2 and later by the image processing bank managing unit 22 are the same as the operations that are performed for the frame 1 by the image processing bank managing unit 22, except that bank addresses to be switched in the operations to be performed for the frame 2 and later are different from the bank addresses that are switched in the operations performed for the frame 1. Thus, in the same manner as the operations performed for the frame 1, the addresses of the bank regions are switched.

In the first embodiment, images of continuous frames are appropriately input and processed using the three banks.

Figure 7:
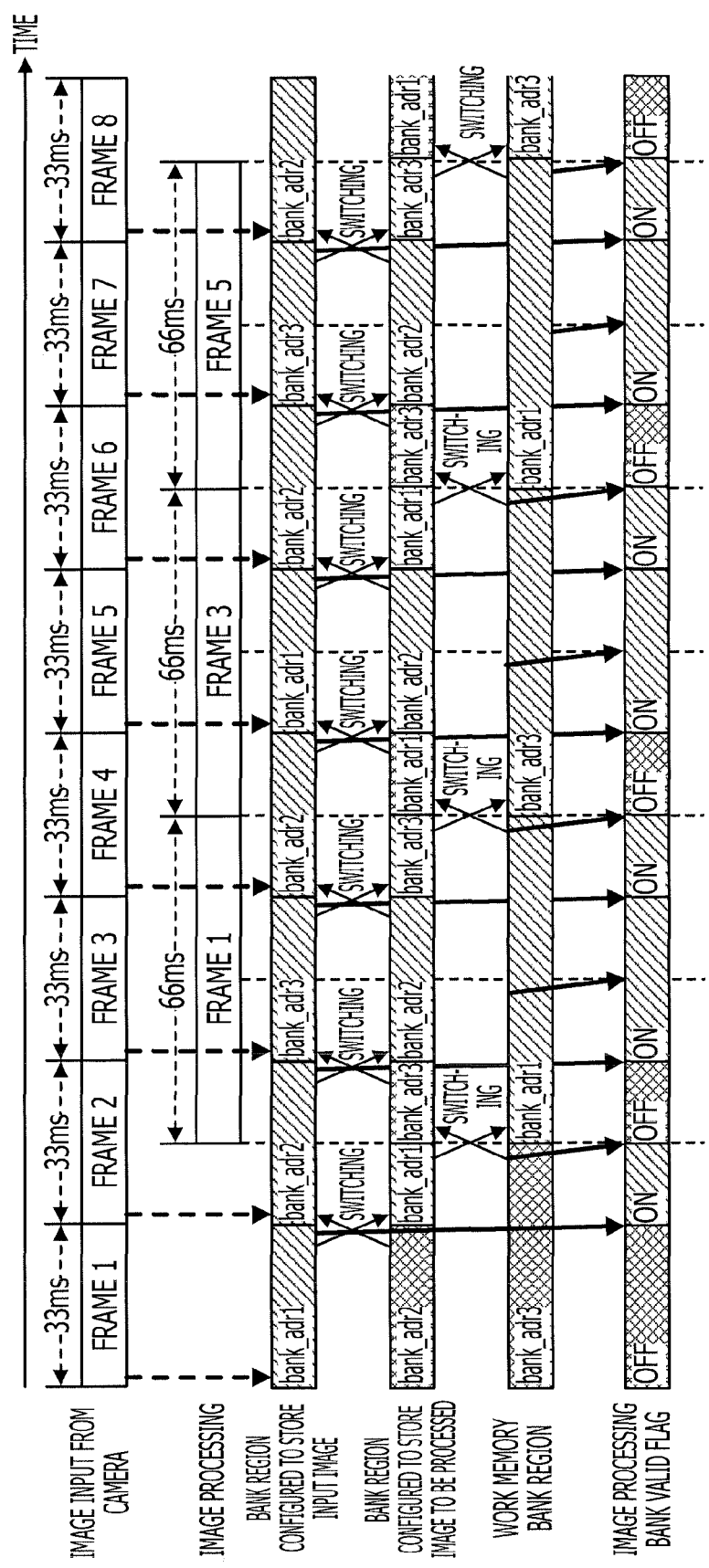
FIG. 7 is a diagram illustrating a second embodiment of the operations of the image processing device.

FIG. 7 is a diagram illustrating a second embodiment of the operations of the image processing device 11. The second embodiment describes an example in which the cycle of the image processing that is performed by the image processing device 11 is equal to two times of the cycle of the input operation (camera input operation) that is performed by the imaging device 10 to input an image to the image processing device 11.

Operations of the input image bank managing unit 21 in the second embodiment are the same as the operations of the input image bank managing unit 21 in the first embodiment.

Operations of the image processing bank managing unit 22 in the second embodiment are basically the same as the operations of the image processing bank managing unit 22 in the first embodiment. However, the cycle of the image processing that is performed by the image processing device 11 is equal to two times of the cycle of the input operation (camera input operation) that is performed by the imaging device 10. Thus, when the bank that is configured to store an image to be processed has the address bank_adr2 assigned thereto, the image processing is not performed on the second frame 2. When the bank that is configured to store an image to be processed has an address bank_adr3 assigned thereto, the image processing starts to be performed on the second frame 2. Thus, in the second embodiment, the frame 3 is processed after the frame 1 is processed, and the frame 2 is not processed. For the same reason, a frame 4 is not performed.

In the second embodiment, since the cycle of the input operation (camera input operation) that is performed by the imaging device 10 is different from the cycle of the image processing that is performed by the image processing device 11, the image processing in which frames are skipped is appropriately performed using the three banks.

Figure 8:
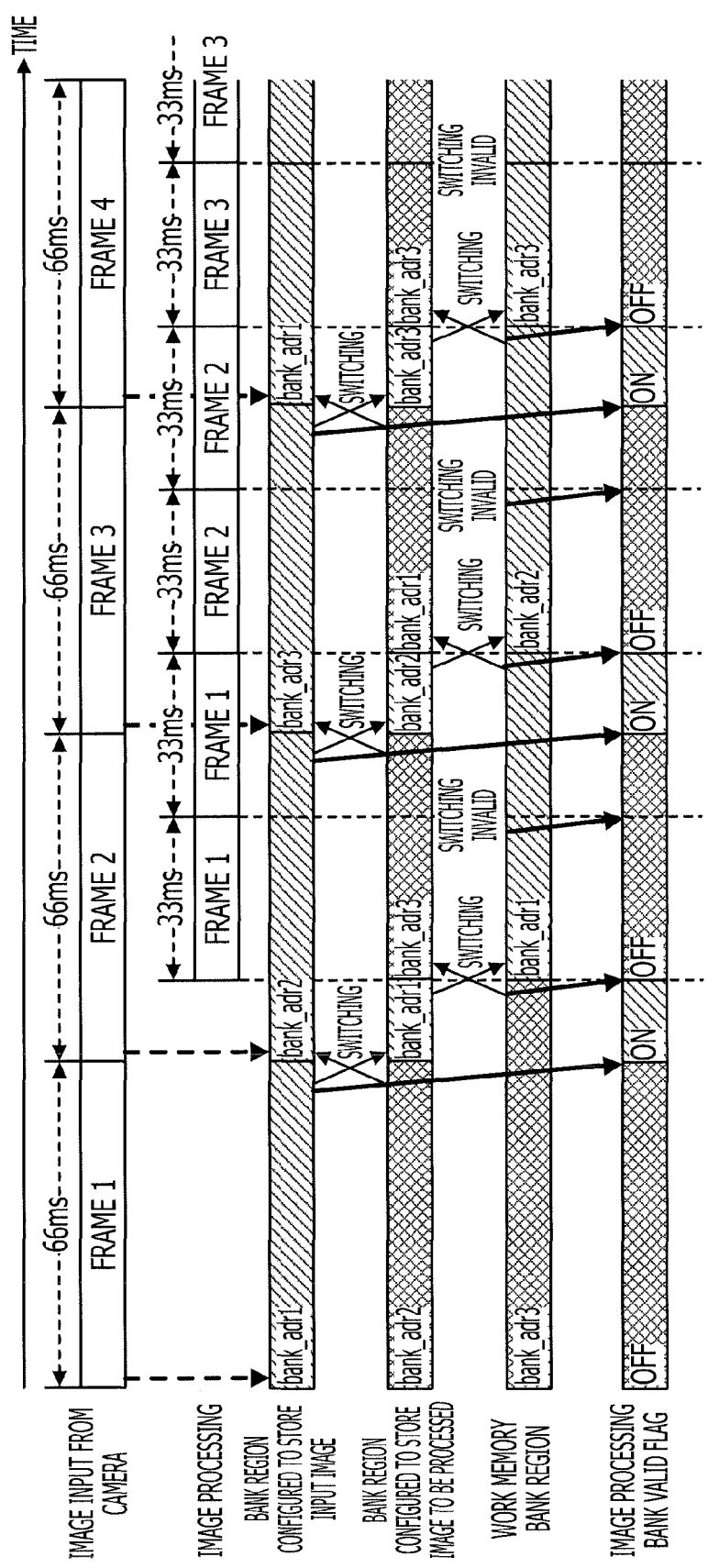
FIG. 8 is a diagram illustrating a third embodiment of the operations of the image processing device.

FIG. 8 is a diagram illustrating a third embodiment of the operations of the image processing device 11. The third embodiment describes an example in which the cycle of the image processing that is performed by the image processing device 11 is equal to a half of the cycle of the input operation (camera input operation) that is performed by the imaging device 10 to input an image to the image processing device 11.

Operations of the input image bank managing unit 21 in the third embodiment are same as the operations of the input image bank managing unit 21 in the first and second embodiments.

Operations of the image processing bank managing unit 22 in the third embodiment are basically the same as the operations of the image processing bank managing unit 22 in the first and second embodiments. However, the cycle of the image processing that is performed by the image processing device 11 is equal to the half of the cycle of the input operation (camera input operation) that is performed by the imaging device 10 to input an image to the image processing device 11. Thus, when the bank that is configured to store an input image has the address bank_adr2 assigned thereto, the image processing starts to be performed twice. Since the first image processing causes the image processing bank valid flag 26 to become the OFF state, the address that is stored in the image processing bank management address register 24 and the address that is stored in the work memory management address register 25 are not switched in the second image processing. As a result, the frame 1 is repeatedly subjected to the image processing twice. In this example, although the frame 1 is subjected to the image processing twice, whether or not the second image processing is performed on the frame 1 depends on a design item. Since a frame to be processed is the frame 1 and not changed, the second image processing may not be performed on the frame 1.

In the third embodiment, since the cycle of the input operation (camera input operation) that is performed by the imaging device 10 is different from the cycle of the image processing that is performed by the image processing device 11, the image processing in which frames are repeatedly processed is appropriately performed using the three banks.

Figure 9:
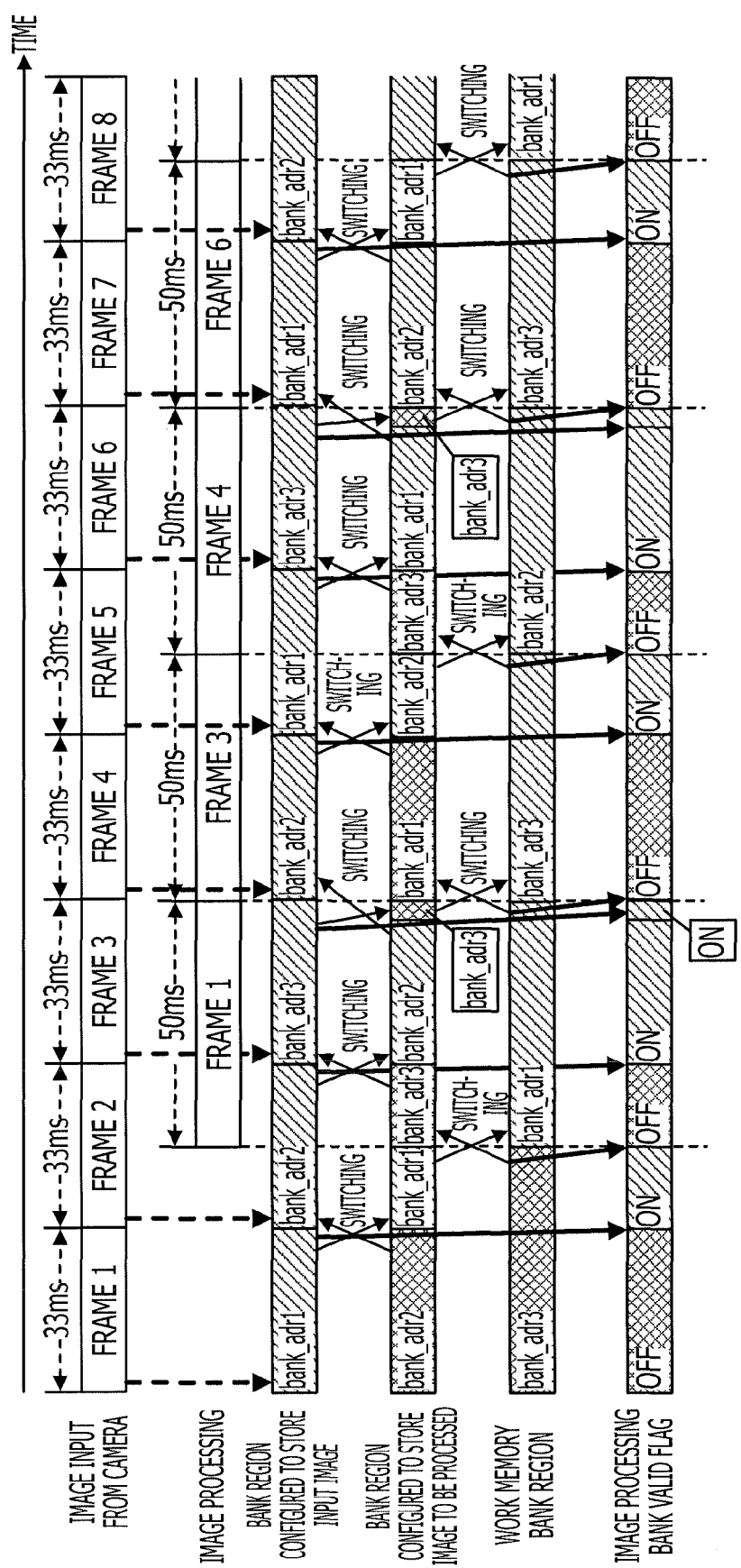
FIG. 9 is a diagram illustrating a fourth embodiment of the operations of the image processing device.

FIG. 9 is a diagram illustrating a fourth embodiment of the operations of the image processing device 11. The fourth embodiment describes an example in which the cycle of the image processing that is performed by the image processing device 11 is equal to two-thirds of the cycle of the input operation (camera input operation) that is performed by the imaging device 10 to input an image to the image processing device 11.

Operations of the input image bank managing unit 21 in the fourth embodiment are the same as the operations of the input bank managing unit 21 in the first to third embodiments.

Operations of the image processing bank managing unit 22 in the fourth embodiment are basically the same as the operations of the image processing bank managing unit 22 in the first to third embodiments. However, the cycle of the image processing that is performed by the image processing device 11 is equal to two-thirds of the cycle of the input operation (camera input operation) that is performed by the imaging device 10 to input an image to the image processing device 11. Thus, when the bank that is configured to store an image to be processed has the address bank_adr2 assigned thereto, the second image processing does not start to be performed. When the bank that is configured to store an image to be processed has the address bank_adr3 assigned thereto, the second image processing starts to be performed. In this example, the frame 3 is processed after the frame 1 is processed, and the frame 2 is not processed. Although the frame 4 is to be processed, a frame 5 is not processed.

In the fourth embodiment, since the cycle of the image processing that is performed by the image processing device 11 is different from the cycle of the input operation (camera input operation) that is performed by the imaging device 10, the image processing in which frames are skipped are appropriately performed using the three banks.

Figure 10:
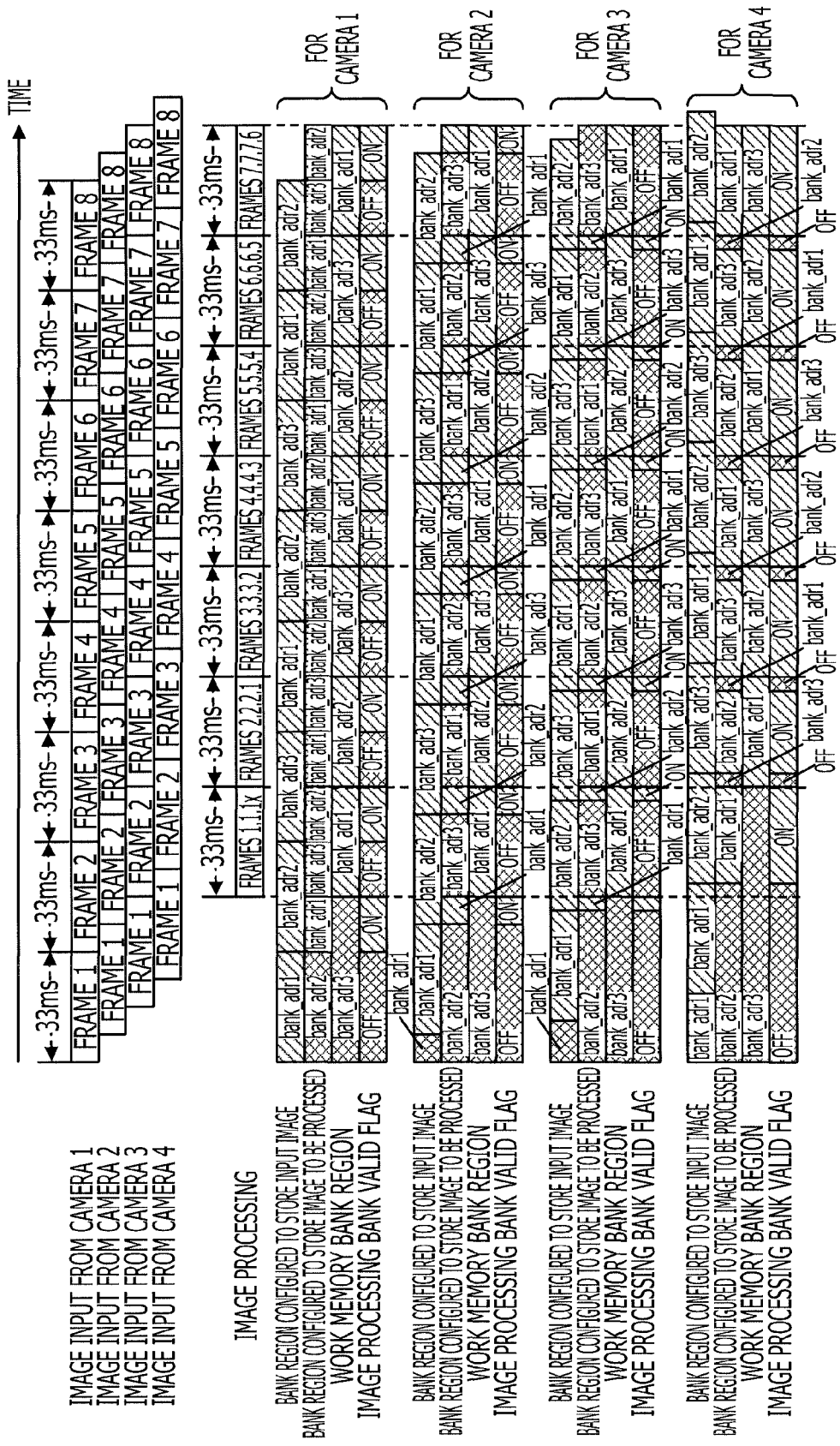
FIG. 10 is a diagram illustrating a fifth embodiment of the operations of the image processing device.

FIG. 10 is a diagram illustrating a fifth embodiment of the operations of the image processing device 11. The fifth embodiment describes an example in which the cycle of the input operation (camera input operation) that is performed by the imaging device 10 is equal to the cycle of the image processing that is performed by the image processing device 11 in the same manner as the first embodiment, and four channels to input images acquired by four cameras are provided. In this example, the times when vertical synchronizing signals Vsync are supplied from the four cameras to the image processing device 11 are different from each other, and four input images that are supplied from the four cameras at the times that are different from each other are collectively processed by the image processing device 11 at the same time. The input image bank managing unit 21 and the image processing bank managing unit 22 are provided for each of the cameras and manage, independently of the other managing unit, the banks for a plurality of series of input images supplied form the plurality of cameras. The image processing unit 14 performs the image processing on the plurality of series of input images at the same time.

The input image bank managing unit 21 that is provided for each of the cameras operates in synchronization with the vertical synchronizing signal Vsync supplied from the camera. In addition, the image processing unit 14 performs the image processing on the images supplied from the four cameras at the same time. Thus, the latest input images supplied form the cameras can be assigned to work memory bank regions for the cameras in synchronization with the cycle of the image processing.

In the fifth embodiment, in the system in which the plurality of imaging devices are connected to the image processing device 11 through the plurality of channels, images of continuous frames can be appropriately input and processed using the three banks.

Figure 11:
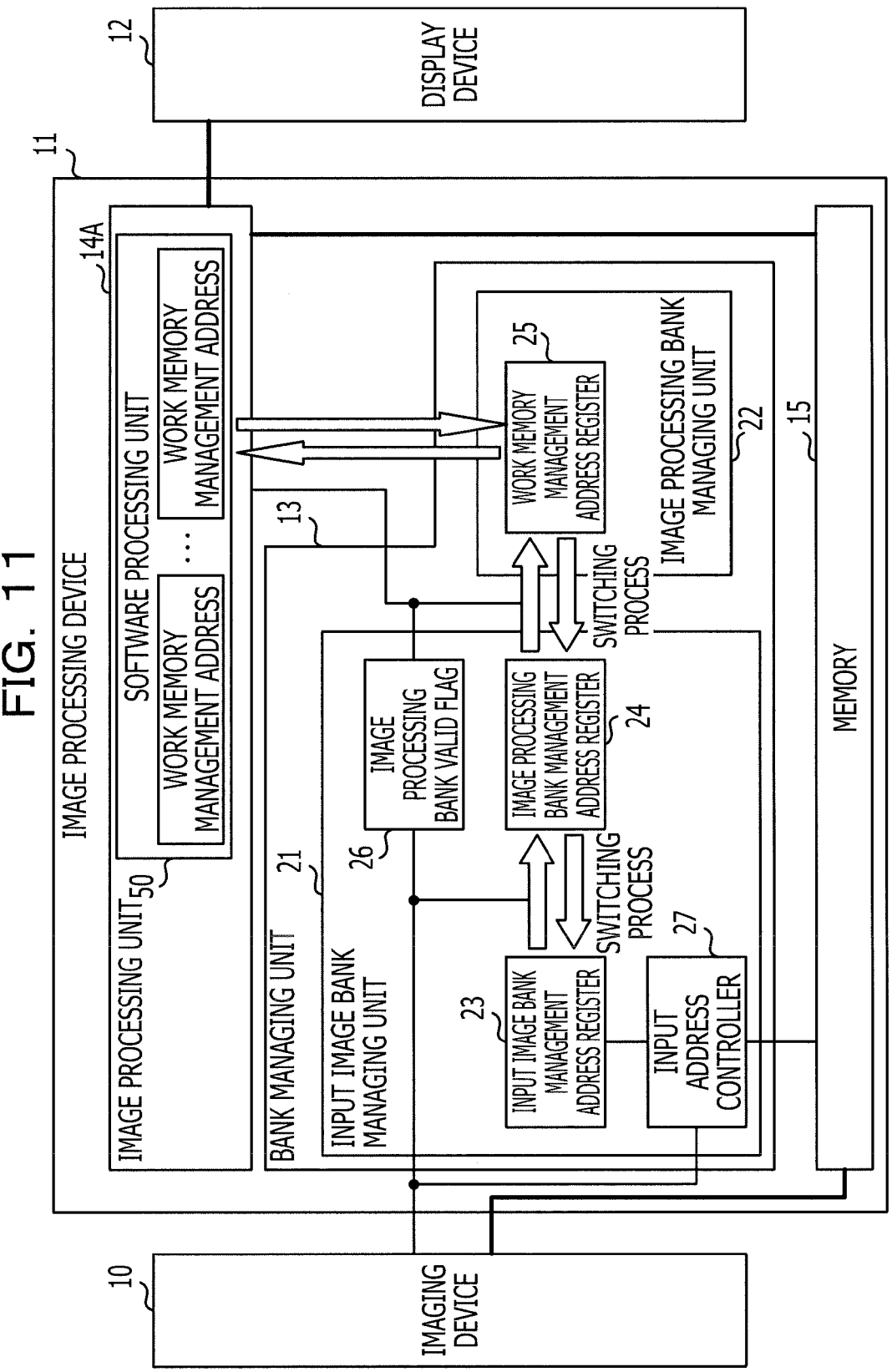
FIG. 11 is a diagram illustrating a modified example of the configuration of the image processing device.

FIG. 11 is a diagram illustrating a modified example of the configuration of the image processing device 11. In FIG. 11, constituent elements that are the same as in illustrated in FIG. 3 are indicated by the same reference numerals as in illustrated in FIG. 3, and a description thereof is omitted. A software processing unit 50 is included in an image processing unit 14A included in the image processing device 11 illustrated in FIG. 11. This feature is different from the configuration of the image processing device 11 illustrated in FIG. 3. The software processing unit 50 holds a plurality of work memory management addresses. The software processing unit 50 can switch the address stored in the work memory management address register 25 and any of the plurality of work memory management addresses held by the software processing unit 50. Thus, the image data that is currently to be subjected to the image processing can be continuously held by the memory 15 while other input image data is not written over the image data that is currently to be subjected to the image processing.

The disclosure is described on the basis of the embodiments, but is not limited to the aforementioned embodiments. The embodiments may be variously modified within the scope described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a memory; and
a processor coupled to the memory and configured to:
set a first address of a first memory bank into an input bank register the input bank register designating the first memory bank to store a new image received from a camera,
set a second address of a second memory bank into a next process bank register, the next processed bank register designating the second memory bank to store a next image to be processed for display,
set a third address of a third memory bank into a processed bank register, the processed bank register designating the third memory bank to store an image to be currently processed for display,
store the new image received from the camera, into the first memory bank based on the first address,
first switch the first address and the second address, between the input bank register and the next processed bank register when the new image is stored into the first memory bank independently of a status of a flag,
set the flag when the first switch is completed;
process the image in the third memory bank for display,
second switch the first address and the third address, between the next processed bank register and the processed bank register, when the flag is set and the image in the third memory bank is processed for display,
reset the flag when the second switch is completed, and
wherein the first switch is executed independently of the status of the flag, and the second switch is executed according to the status of the flag.

2. The image processing device according to claim 1, wherein, after the flag is reset and before the flag is set again, the processor does not switch between the next processed bank register and the processed bank register.

3. The image processing device according to claim 1, wherein the processor is configured to;
receive a plurality of images from a plurality of cameras including the camera, and store the plurality of images into a plurality of first memory banks including the first memory bank, respectively.

4. The image processing device according to claim 3, wherein the processor is configured to set a plurality of flags including the flag respectively, based on a timing of storing of each of the plurality of images.

5. An image processing system comprising:
an imaging device including a camera which acquires a plurality of images;
a display device; and
an image processing device, including
a memory; and
a processor coupled to the memory and configured to:
set a first address of a first memory bank into an input bank register, the input bank register designating the first memory bank to store a new image received from the camera,
set a second address of a second memory bank into a next processed bank register, the next processed bank register designating the second memory bank to store a next image to be processed for display,
set a third address of a third memory bank into a processed bank register, the processed bank register designating the third memory bank to store an image to be currently processed for display,
store the new image received from the camera, into the first memory bank based on the first address,
first switch the first address and the second address, between the input bank register and the next processed bank register and when the new image is stored into the first memory bank independently of a status of a flag,
set the flag when the first switch is completed;
process the image in the third memory bank for display,
second switch the first address and the third address, between the next processed bank register and the processed bank register, when the flag is set and the image in the third memory bank is processed for display, and
reset the flag when the second switch is completed,
wherein the first switch is executed independently of the status of the flag, and the second switch is executed according to the status of the flag.

6. The image processing system according to claim 5, wherein after the flag is reset and before the flag is set again, the processor does not switch between the next processed bank register and the processed bank register.

7. The image processing system according to claim 5, wherein the processor is configured to:
receive a plurality of images from a plurality of cameras including the camera, and
store the plurality of images into a plurality of first memory banks including the first memory bank, respectively.

8. The image processing system according to claim 5, wherein the processor is configured to set a plurality of flags including the flag respectively, based on a timing of storing of each of the plurality of images.

9. An image processing method executed by a computer, the image processing method comprising:
setting a first address of a first memory bank into an input bank register, the input bank register designating the first memory bank to store a new image received from a camera;
setting a second address of a second memory bank into a next processed bank register, the next processed bank register designating the second memory bank to store a next image to be processed by an image processing unit;
setting a third address of a third memory bank into a processed bank register, the processed bank register designating the third memory bank to store an image to be currently processed by the image processing unit;
storing the new image received from the camera, into the first memory bank based on the first address;
first switching the first address and the second address, between the input bank register and the next processed bank register when the storing of the new image is completed independently of a status of a flag;
setting the flag when the first switching is completed;
processing the image to be currently processed by the image processing unit;
second switching the first address and the third address, between the next processed bank register and the processed bank register, when the flag is set and the processing of the image by the image processing unit is completed; and
resetting the flag when the second switching is completed,
wherein the first switching is executed independently of the status of the flag, and the second switching is executed according to the status of the flag.

10. The image processing method according to claim 9, wherein after the flag is reset and before the flag is set again there is no switching between the next processed bank register and the processed bank register.

11. The image processing method according to claim 9, wherein the processor is further configured to:
receive a plurality of images from a plurality of cameras including the camera; and
store the plurality of images into a plurality of first memory banks including the first memory bank, respectively.

12. The image processing method according to claim 9, wherein the processor is configured to set a plurality of flags including the flag, respectively, based on a timing of storing each of the plurality of images.

* * * * *

UNITED STATES PATENT AND TRADEMARK OFFICE
CERTIFICATE OF CORRECTION

| | | |
|---|---|---|
| PATENT NO. | : 9,117,298 B2 | Page 1 of 1 |
| APPLICATION NO. | : 13/409696 | |
| DATED | : August 25, 2015 | |
| INVENTOR(S) | : Toru Tsuruta et al. | |

It is certified that error appears in the above-identified patent and that said Letters Patent is hereby corrected as shown below:

In the claims,

Claim 5, Column 15, Line 30

Delete "register and" and insert --register--, therefor.

Signed and Sealed this
Twenty-fourth Day of November, 2015

Michelle K. Lee
*Director of the United States Patent and Trademark Office*